(12) United States Patent
Beierwaltes et al.

(10) Patent No.: US 9,878,924 B2
(45) Date of Patent: Jan. 30, 2018

(54) CONTAMINANT REMOVAL FROM WATER BODIES WITH BIOCHAR

(71) Applicant: BIOCHAR NOW, LLC, Loveland, CO (US)

(72) Inventors: William T. Beierwaltes, Loveland, CO (US); James G. Gaspard, II, Loveland, CO (US)

(73) Assignee: Biochar Now, LLC, Loveland, CO (US)

( * ) Notice: Subject to any disclaimer, the term of this patent is extended or adjusted under 35 U.S.C. 154(b) by 172 days.

(21) Appl. No.: 15/012,226

(22) Filed: Feb. 1, 2016

(65) Prior Publication Data

US 2016/0229709 A1    Aug. 11, 2016

Related U.S. Application Data

(60) Provisional application No. 62/113,275, filed on Feb. 6, 2015.

(51) Int. Cl.
*C02F 1/28* (2006.01)
*B01D 29/11* (2006.01)
(Continued)

(52) U.S. Cl.
CPC ............ *C02F 1/286* (2013.01); *B01D 29/114* (2013.01); *C02F 1/283* (2013.01); *C05G 3/0094* (2013.01); *C05G 3/04* (2013.01); *C02F 2101/103* (2013.01); *C02F 2101/105* (2013.01); *C02F 2101/16* (2013.01); *C02F 2101/163* (2013.01); *C02F 2101/20* (2013.01);
(Continued)

(58) Field of Classification Search
None
See application file for complete search history.

(56) References Cited

U.S. PATENT DOCUMENTS 414,938 A   11/1889  Burcey
2,847,369 A   8/1958  Hughes
(Continued)

FOREIGN PATENT DOCUMENTS

JP        4267968      5/2009
KR   1020020010902    2/2002
(Continued)

OTHER PUBLICATIONS

International Preliminary Report on Patentability for International Application No. PCT/US2013/030079, dated Aug. 19, 2014, 5 pp.
(Continued)

*Primary Examiner* — Chester T Barry
(74) *Attorney, Agent, or Firm* — Trenner Law Firm, LLC; Mark D. Trenner

(57) ABSTRACT

A system and method for contaminant removal from water bodies with biochar are disclosed. An example system includes an anchor, a float, and an attachment line extending between the anchor and the float. One or more porous container is provided on the attachment line. The porous container has biochar therein. The container with the biochar is provided into a water body and maintained on the attachment line between the anchor and the float. The biochar in the porous container sequesters contaminants in the water body.

18 Claims, 4 Drawing Sheets

(51) Int. Cl.
*C05G 3/00* (2006.01)
*C05G 3/04* (2006.01)
*C02F 101/10* (2006.01)
*C02F 101/16* (2006.01)
*C02F 101/20* (2006.01)
*C02F 101/22* (2006.01)
*C02F 103/00* (2006.01)

(52) U.S. Cl.
CPC .... *C02F 2101/203* (2013.01); *C02F 2101/22* (2013.01); *C02F 2103/007* (2013.01); *C02F 2201/002* (2013.01); *C02F 2201/008* (2013.01)

(56) References Cited

U.S. PATENT DOCUMENTS

| | | | |
|---|---|---|---|
| 3,777,676 A | 12/1973 | Lagen | |
| 4,167,909 A | 9/1979 | Dauvergne | |
| 4,261,269 A | 4/1981 | Mallek et al. | |
| 4,419,942 A | 12/1983 | Johnson | |
| 5,014,680 A | 5/1991 | Siemer | |
| 5,018,458 A | 5/1991 | McIntyre et al. | |
| 5,190,901 A | 3/1993 | Hirai | |
| 5,499,622 A | 3/1996 | Woods | |
| 5,770,079 A * | 6/1998 | Haase | C02F 1/685 210/150 |
| 6,790,317 B2 | 9/2004 | Antal, Jr. | |
| 7,354,557 B2 | 4/2008 | Muramatsu | |
| 7,371,308 B1 | 5/2008 | Hackl | |
| 7,399,458 B1 | 7/2008 | Martin | |
| 8,100,990 B2 | 1/2012 | Ellens et al. | |
| 8,361,186 B1 | 1/2013 | Shearer et al. | |
| 8,747,797 B2 | 6/2014 | Shearer et al. | |
| 8,812,162 B2 | 8/2014 | Schneider et al. | |
| 8,986,507 B2 | 3/2015 | Schottdorf | |
| 9,139,790 B2 | 9/2015 | Taniguro et al. | |
| 9,321,966 B2 | 4/2016 | Wang | |
| 9,725,371 B2 * | 8/2017 | Shearer | C05B 17/00 |
| 2003/0024165 A1 | 2/2003 | Antal, Jr. | |
| 2003/0136734 A1 | 7/2003 | Mirzayi et al. | |
| 2004/0178052 A1 | 9/2004 | Antal, Jr. | |
| 2005/0051918 A1 | 3/2005 | Muramatsu | |
| 2008/0223269 A1 | 9/2008 | Paoluccio | |
| 2009/0211892 A1 | 8/2009 | Cunningham | |
| 2010/0120128 A1 * | 5/2010 | Liang | C01B 32/05 435/266 |
| 2011/0114144 A1 | 5/2011 | Green et al. | |
| 2011/0172092 A1 | 7/2011 | Lee et al. | |
| 2011/0252699 A1 | 10/2011 | Shepard | |
| 2012/0079762 A1 | 4/2012 | Schottdorf | |
| 2012/0116589 A1 | 5/2012 | Schneider et al. | |
| 2012/0193212 A1 | 8/2012 | Taniguro et al. | |
| 2012/0304718 A1 | 12/2012 | Cheiky et al. | |
| 2012/0305380 A1 | 12/2012 | Wang | |
| 2014/0151296 A1 * | 6/2014 | Moore | C02F 1/283 210/616 |
| 2015/0040804 A1 | 2/2015 | Aupperle | |
| 2015/0136581 A1 | 5/2015 | Aupperle | |
| 2015/0144564 A1 | 5/2015 | Moller et al. | |
| 2015/0237813 A1 * | 8/2015 | Field | A01G 15/00 239/14.1 |
| 2016/0075567 A1 * | 3/2016 | Tour | C02F 1/001 210/682 |
| 2016/0229709 A1 | 8/2016 | Beierwaltes | |
| 2017/0055502 A1 * | 3/2017 | Gagliano | A01K 61/002 |

FOREIGN PATENT DOCUMENTS

| | | | |
|---|---|---|---|
| WO | WO 2006117006 | 11/2006 | |
| WO | WO 2010122525 | 10/2010 | |
| WO | WO 2010129996 | 11/2010 | |
| WO | WO 2011097183 | 8/2011 | |
| WO | WO -2011097183 A2 * | 8/2011 | ............ B01J 20/20 |
| WO | WO 2011143718 | 11/2011 | |
| WO | WO 2013126477 | 8/2013 | |
| WO | WO 2013152337 | 10/2013 | |
| WO | WO -2013152337 A1 * | 10/2013 | ............ C05D 9/02 |
| WO | WO 2014059141 | 4/2014 | |
| WO | WO 2014170670 | 11/2014 | |
| WO | WO 2014179670 | 11/2014 | |

OTHER PUBLICATIONS

International Preliminary Report on Patentability for International Application No. PCT/US2013/025999, dated Aug. 19, 2014, 5 pp.
International Search Report and the Written Opinion for app. No. PCT/US2016/015943 dated Jun. 9, 2016, 11 pgs.
International Search Report and the Written Opinion for app. No. PCT/US2013/025999 dated Jun. 12, 2013, 8 pgs.
International Search Report and the Written Opinion for app. No. PCT/US2013/030079 dated Jun. 18, 2013, 9 pgs.
English abstract for JP No. 4267968 dated May 27, 2009, 2 pgs.
Machine Translation of KR-10-2002-0010902, obtained from KIPRIS, Feb. 6, 2002, 83 pp.
International Preliminary Report on Patentability for International Application No. PCT/US2016/015943, dated Aug. 8, 2017, 7 pp.

* cited by examiner

CONTAMINANT REMOVAL FROM WATER BODIES WITH BIOCHAR

PRIORITY CLAIM

This application claims the priority filing date of U.S. Provisional Patent Application No. 62/113,275 filed Feb. 6, 2015 and titled "Contaminant Removal From Water Bodies With Biochar" of Beierwaltes, et al., hereby incorporated by reference for all that is disclosed as though fully set forth herein.

BACKGROUND

Nutrient (e.g., nitrogen and phosphorus) pollution in water bodies (e.g., rivers, streams, lakes, ponds, reservoirs, retention ponds) is a major pollution problem. Nutrients may run off farmland and other fields (e.g., grazing), land inhabited by wildlife, and even land in urban areas (e.g., where lawn fertilizers are used or pet waste is left). These nutrients may cause high levels of algae and other plant growth. This growth takes oxygen and sunlight out of the ecosystem. The water then becomes unsafe for humans and animals and causes so-called "dead" zones where fish cannot survive.

DETAILED DESCRIPTION

It has been reported that algae blooms begin to flourish when phosphorus levels reach about 0.05 to about 0.1 ppm. Physically removing nutrients from the waterways enables the ecosystems to return to normal and safe conditions with improved water clarity.

Nutrient loading is made up of three main constituents: soluble and insoluble phosphorus, nitrogen and algae/plant growth. The algae/plant growth consumes a significant amount of phosphorus but as algae/plants seasonally die and decay, it returns the phosphorus back to the water for renewed use the following year.

Biochar effectively physically removes and sequesters nutrients from the waterways. Biochar is made from biomass, such as but not limited to beetle-kill pine trees and waste woods. When properly processed, biochar has special properties that allow the biochar to attract and sequester certain molecules, such as phosphorus and nitrogen, while also mechanically filtering algae. Lab analyses show that biochar sequesters phosphorus with up to about 99.9% effectiveness, while reducing turbidity (e.g., due to algae) by the same amount.

An example system for contaminant removal from water bodies with biochar includes an anchor, a float, and an attachment line extending between the anchor and the float. One or more porous container is provided on the attachment line. The porous container has biochar therein. The container with the biochar is provided into a water body and maintained on the attachment line between the anchor and the float. The biochar in the porous container sequesters contaminants in the water body.

An example method of contaminant removal from water bodies with biochar includes: loading biochar into a porous container; providing the porous container with the biochar into a water body; and sequestering contaminants in the water body by the biochar in the porous container.

Before continuing, it is noted that as used herein, the terms "includes" and "including" mean, but is not limited to, "includes" or "including" and "includes at least" or "including at least." The term "based on" means "based on" and "based at least in part on."

Figure 1:
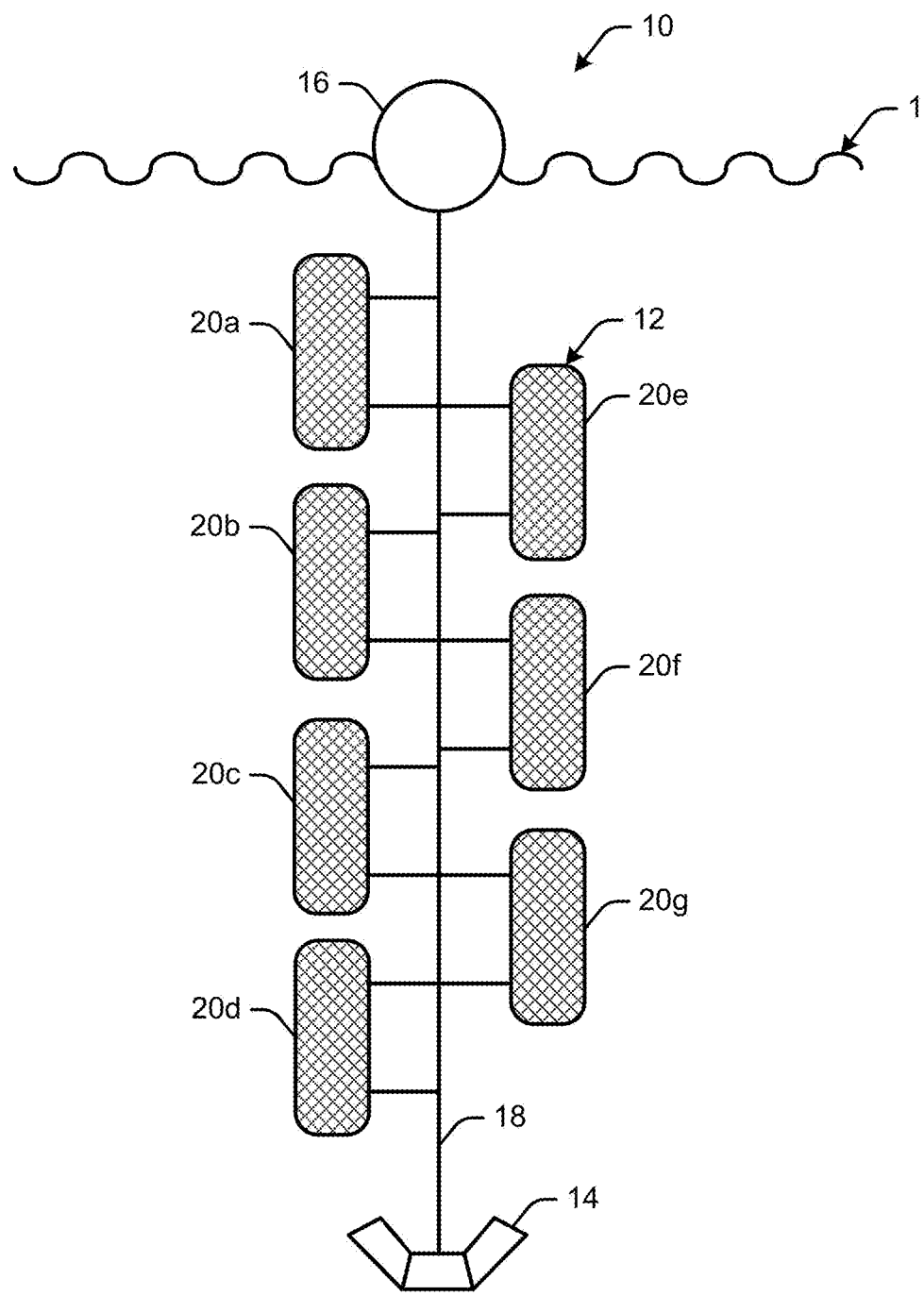
FIG. 1 shows an example system for contaminant removal from water bodies using biochar.

FIG. 1 shows an example system 10 for contaminant removal from water bodies 1 using biochar. An example system 10 for contaminant removal from water bodies 1 with biochar 12 includes an anchor 14, a float 16, and an attachment line 18 extending between the anchor 14 and the float 16. One or more porous container (e.g., containers 20a-g) with biochar 12 is provided on the attachment line 18. The container(s) 20a-g with the biochar 12 is provided into a water body 1 and maintained on the attachment line 18 between the anchor 14 and the float 16. The biochar 12 in the porous container(s) 20a-g sequesters contaminants in the water body 1.

In an example, biochar 12 is loaded into porous "bags" or container(s) 20a-g, such as but not limited to, mesh bags or otherwise porous containers. The porous containers can then be placed in the water body 1 where natural currents cause the water to flow through the porous containers. As water flows through the porous containers, nutrients in the water body 1 (e.g., phosphorus and nitrogen) are sequestered by the biochar 12. Algae and other nutrient enriched plant material may also be filtered by the porous containers. When the porous containers are at or near nutrient-holding capacity, the porous containers can be retrieved or otherwise recovered to physically remove the pollutants from the water body 1.

In an example, the floats 16, attachment line 18 (e.g., ropes or chains) and anchors 14 are provided as a suspension mechanism for attaching the biochar porous container(s). The porous containers may be clipped to the attachment line 18 to enable exposure to the water's natural currents. One or more porous containers can be attached to a single chain, and one or more attachment lines 18 can be used for increased effectiveness.

When the biochar 12 reaches its storage capacity, the attachment line 18 and porous containers 20a-b can be pulled out of the water, e.g., into a boat or other vessel. The porous containers can then be removed from the attachment line 18 and, if desired, new porous containers can be provided on the attachment line 18 and placed back in the water body 1 for continued contaminant removal.

It is noted that the harvested porous containers 20a-g are loaded with a nutrient-rich biochar, which can be provided for secondary purposes such as, but not limited to, a soil amendment. For example, the biochar 12 (with or without the porous containers 20a-g) can be sold to local gardeners and garden centers. These sales may help offset the cost of the porous containers and/or operations.

Before continuing, it should be noted that the examples described above are provided for purposes of illustration, and are not intended to be limiting. Other devices and/or device configurations may be utilized to carry out the operations described herein.

Figure 2:
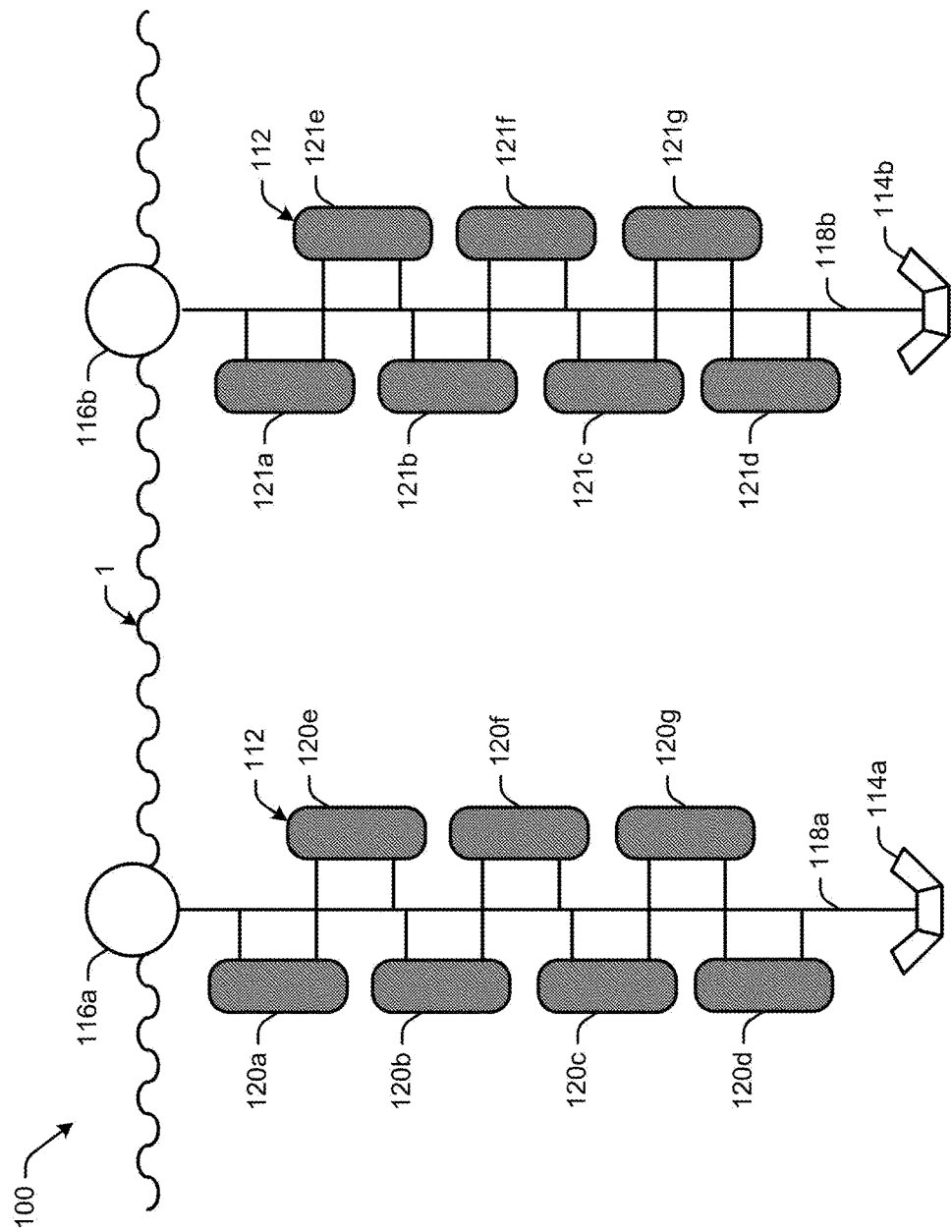
FIG. 2 shows another example system for contaminant removal from water bodies using biochar.

FIG. 2 shows another example system 100 for contaminant removal from water bodies 1 using biochar. It is noted that 100-series reference numbers are used to refer to like-components as already described above for FIG. 1. It is noted that although two attachment lines are shown, more than two attachment lines may be provided. Likewise, more than one attachment line may be provided on a single anchor and/or on a single float. These and other configurations will be readily appreciated by those having ordinary skill in the art after becoming familiar with the teachings herein.

The example system 100 for contaminant removal from water bodies 1 with biochar 112 includes more than one anchor 114a and 114b, floats 116a and 116b, and respective attachment lines 118a and 118b extending between the respective anchors 114a and 114b, and the respective floats 116a and 116b. One or more porous container (e.g., containers 120a-g and 121a-g), each loaded with biochar 112, is provided on the attachment lines 118a and 118b. The container(s) 120a-g and 121a-g with the biochar 112 is provided into a water body 1 and maintained on the attachment line 118 between the anchors 114a and 114b, and the respective floats 116a and 116b.

Figure 3:
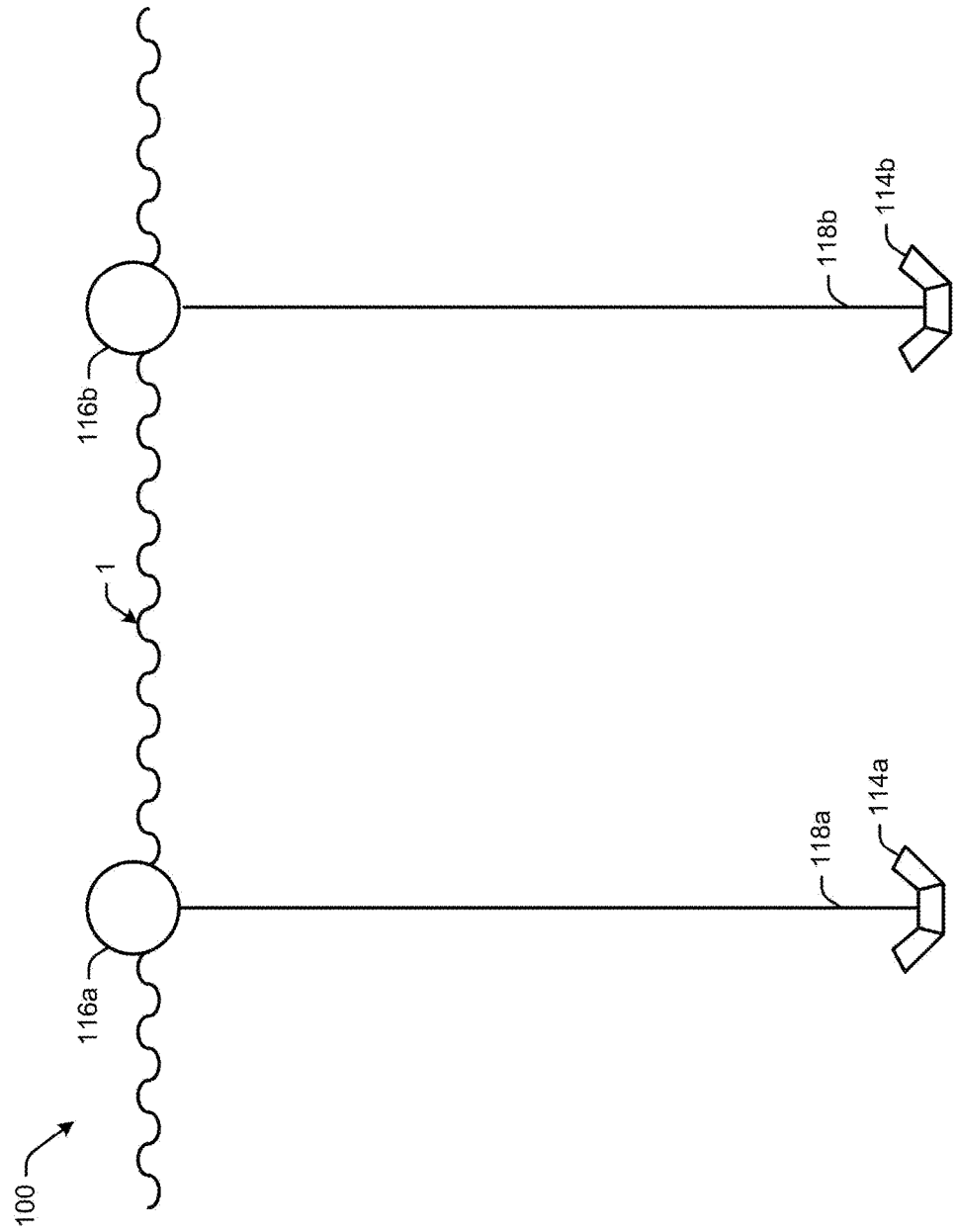
FIG. 3 shows an example system for contaminant removal from water bodies using biochar, wherein loaded porous containers are removed.

The biochar 112 in the porous container(s) 120a-g and 121a-g sequesters contaminants in the water body 1. When the biochar 12 reaches its storage capacity, the attachment line 18 and porous containers 20a-b can be pulled out of the water, e.g., into a boat or other vessel. The porous containers can then be removed from the attachment line 18. FIG. 3 shows an example system 100 for contaminant removal from water bodies 1 using biochar 112, wherein the loaded porous containers (e.g., 120a-g and 121a-g in FIG. 2) have been removed from the attachment lines 118a and 118b.

Figure 4:
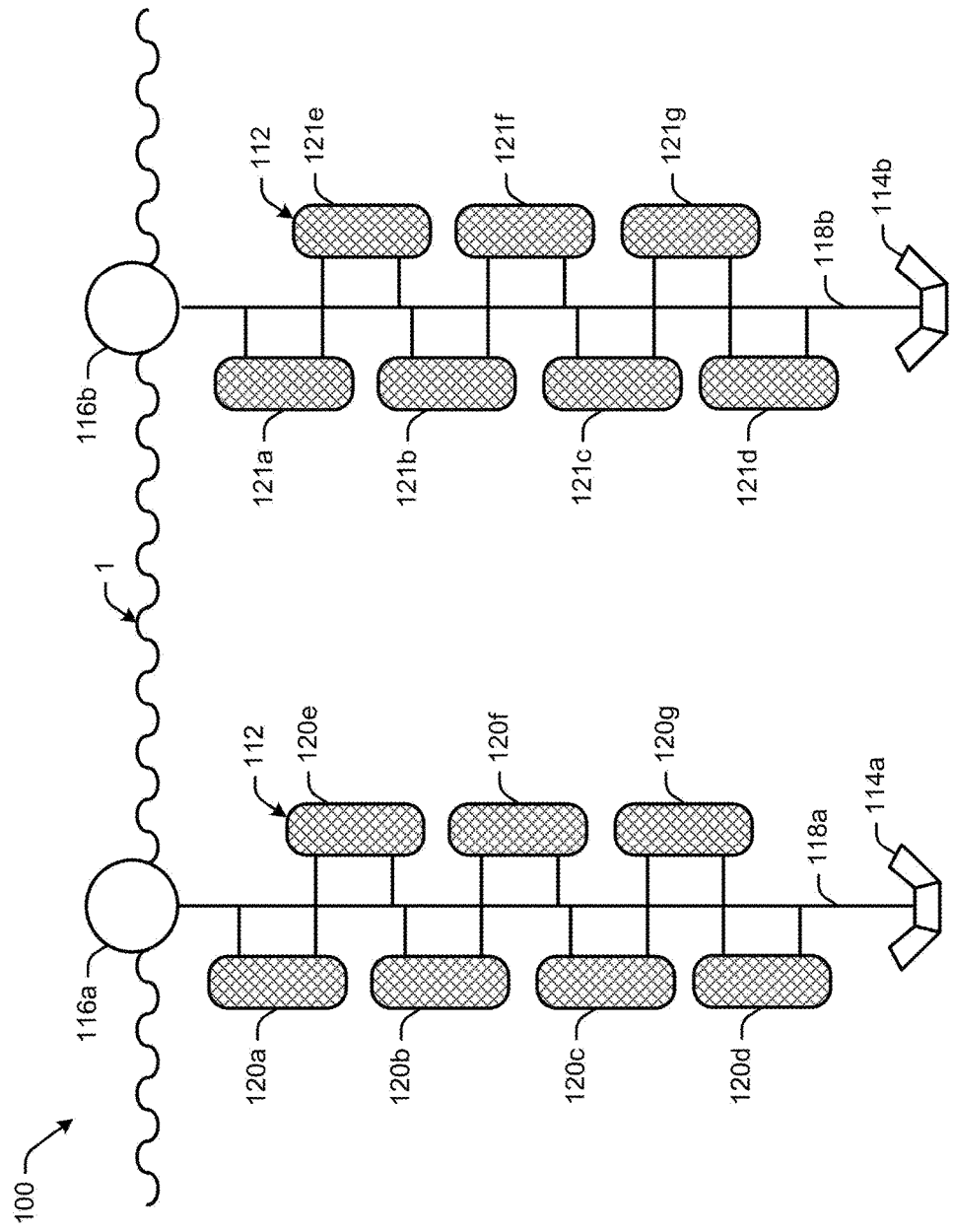
FIG. 4 shows an example system for contaminant removal from water bodies using biochar, wherein porous containers are replaced.

Removing one or more of the porous containers 120a-g and 121a-g from the water body 1, after the biochar 112 has been loaded with nutrients, physically removes the sequestered contaminants from the water body 1. The porous containers may then be replaced to continue contaminant removal. FIG. 4 shows an example system for contaminant removal from water bodies using biochar, wherein the porous containers are replaced.

The operations shown and described herein are provided to illustrate example implementations. The operations are not limited to the ordering shown. Still other operations may also be implemented.

The harvested porous containers 120a-g and 121a-g are loaded with a nutrient-rich biochar, which can be provided for a secondary purpose. In an example, the secondary purpose is as a soil amendment. In another example, the secondary purpose is to increase plant growth and yields. The biochar 112, after being removed from the water, can be removed from the containers 120a-g and 121a-g and/or provided in the container. The biochar 112 serves as a time-release capsule making the nutrients available throughout a growing season. The containers 120a-g and 121a-g with biochar 112 support increased microbial community for living soil conditions and water retention for drought tolerance.

In yet another example, the secondary purpose is to protect nutrients in the biochar from being washed away by precipitation and/or shrinkage by evaporation. Still other secondary purposes are contemplated, as will be understood by those having ordinary skill in the art after becoming familiar with the teachings herein.

It is noted that phosphorus is not the only pollutant that can be sequestered by the biochar. Preliminary test results show the biochar in porous containers as described above with reference to the Figures also removed the following contaminants from water at the removal rates shown below:

Turbidity (e.g., filtering algae) 99.9%
Solids 80.2%
Phosphorus—insoluble 99.9%
Phosphorus—soluble 99.8%
Phosphate 86.6%
Ammonia 89.7%
Nitrate 64.3%
Aluminum 93.8%
Arsenic 98.1%
Beryllium 99.0%
Cadmium 100%
Chromium 84.2%
Cobalt 100%
Copper 95.1%
Iron 99.6%
Lead 99.2%
Magnesium 69.2%
Molybdenum 100%
Nickel 100%
Selenium 100%
Tin 100%
Vanadium 75.0%
Zinc 99.7%

The biochar can be applied to increase plant growth and yields. Biochar added to gardens and agriculture applications has been shown to provide significant growth enhancement. However, pre-charging the biochar with nutrients (e.g., as described above with reference to the illustration in the Figures), before installation into the soil increases plant growth. In addition, the biochar sequesters nutrients and protects these nutrients from being washed away by precipitation and/or shrinkage by evaporation. The biochar serves as a time-release capsule to make the nutrients plant-available throughout the growing season. The biochar also supports increased microbial community for living soil conditions and water retention for drought tolerance.

In another example, the biochar may also be used for removing nutrient pollution from field runoff. Such application may be enabled by farmers installing collection basins below ground level where the porous containers are provided on floats and chains. The porous containers may be removed and replaced as needed and then added to fields for improved yields.

The examples shown and described are provided for purposes of illustration and are not intended to be limiting. Still other examples are also contemplated.

The invention claimed is:

1. A method of contaminant removal from water bodies with biochar, comprising:
   loading biochar into a porous container;
   providing the porous container with the biochar into a water body;
   sequestering contaminants in the water body by the biochar in the container;
   removing the porous container from the water body after the biochar has been loaded with nutrients, thereby physically removing the sequestered contaminants from the water body; and
   providing the biochar loaded with nutrients for a secondary purpose.

2. The method of claim 1, wherein the secondary purpose is amending the soil.

3. The method of claim 1, wherein the secondary purpose is increasing plant health, growth and yields.

4. The method of claim 1, wherein the secondary purpose is protecting nutrients in the biochar from being washed away by precipitation and/or shrinkage by evaporation.

5. The method of claim 1, wherein the container with biochar, after being removed from the water and applied to land, is a time-release capsule making the nutrients available throughout a growing season.

6. The method of claim 1, wherein the container with biochar supports increased microbial community for living soil conditions and water retention of the soil for drought tolerance.

7. The method of claim 1, further comprising installing the container in a collection basin below ground adjacent a field.

8. The method of claim 1, further comprising removing nutrient pollution from field runoff.

9. The method of claim 1, further comprising removing and replacing the container as needed and then adding the charged container to a field for improved plant yield.

10. A system for contaminant removal from water bodies with biochar, comprising:
   an anchor;
   a float;
   an attachment line extending between the anchor and the float;
   a porous container on the attachment line, the porous container having biochar therein;
   wherein the container with the biochar is provided into a water body and maintained on the attachment line between the anchor and the float, the biochar in the porous container sequestering contaminants in the water body.

11. The system of claim 10, wherein the porous container is a mesh bag.

12. The system of claim 10, wherein the porous container is removably attached to the attachment line.

13. The system of claim 10, wherein the porous container is configured to be removed from the water body to physically remove the sequestered contaminants from the water body.

14. The system of claim 13, wherein the porous container is configured to be replaced with another porous container after removal.

15. The system of claim 12, wherein the porous container is configured to be exposed to natural currents in the water body for sequestration.

16. The system of claim 10, further comprising a plurality of porous containers on a single attachment line.

17. The system of claim 10 further comprising a plurality of attachment lines.

18. The system of claim 10 wherein contaminants sequestrated by the biochar include at least one of: turbidity, algae, solids, soluble phosphorus, insoluble phosphorus, phosphate, ammonia, nitrate, nitrogen, aluminum, arsenic, beryllium, cadmium, chromium, cobalt, copper, iron, nickel, lead, magnesium, molybdenum, tin, vanadium, selenium, and zinc.

* * * * *